(12) United States Patent
Beckmann et al.

(10) Patent No.: US 10,378,653 B2
(45) Date of Patent: Aug. 13, 2019

(54) VALVE FOR THE METERING OF HIGHLY PRESSURIZED FLUID

(71) Applicant: Robert Bosch GmbH, Stuttgart (DE)

(72) Inventors: Thilo Beckmann, Litzendorf Naisa (DE); Stefanie Capek, Stuttgart (DE); Guido Pilgram, Gundelsheim (DE); Ralf Kromer, Vaihingen (DE)

(73) Assignee: Robert Bosch GmbH, Stuttgart (DE)

( * ) Notice: Subject to any disclaimer, the term of this patent is extended or adjusted under 35 U.S.C. 154(b) by 316 days.

(21) Appl. No.: 15/032,923

(22) PCT Filed: Sep. 5, 2014

(86) PCT No.: PCT/EP2014/068930
§ 371 (c)(1),
(2) Date: Apr. 28, 2016

(87) PCT Pub. No.: WO2015/067389
PCT Pub. Date: May 14, 2015

(65) Prior Publication Data
US 2016/0281857 A1    Sep. 29, 2016

(30) Foreign Application Priority Data

Nov. 6, 2013 (DE) .................. 10 2013 222 508

(51) Int. Cl.
*F02M 55/00* (2006.01)
*F16J 15/48* (2006.01)
*F16L 21/02* (2006.01)

(52) U.S. Cl.
CPC ............ *F16J 15/48* (2013.01); *F02M 55/004* (2013.01); *F02M 55/005* (2013.01); *F16L 21/02* (2013.01);
(Continued)

(58) Field of Classification Search
CPC .. Y10T 137/9029; F16J 15/48; F02M 55/005; F02M 2200/856; F02M 2200/9015; F02M 55/004; F16L 21/02
(Continued)

(56) References Cited

U.S. PATENT DOCUMENTS 2,851,291 A * 9/1958 Payne ................. F16J 15/38
277/394
3,129,948 A * 4/1964 Kendall ................ F16J 15/185
277/514
(Continued)

FOREIGN PATENT DOCUMENTS

CN     1973126 A    5/2007
DE    10106168 A1   8/2002
(Continued)

OTHER PUBLICATIONS

International Search Report for PCT/EP2014/068930, dated Dec. 5, 2014.

*Primary Examiner* — Marina A Tietjen
*Assistant Examiner* — Frederick D Soski
(74) *Attorney, Agent, or Firm* — Norton Rose Fulbright US LLP; Gerard Messina (57) ABSTRACT

A valve for metering highly pressurized fluid, having an inlet connector that can be placed into a connection socket of a fluid supply line, and a sealing assembly situated on the inlet connector, the sealing assembly having an elastically deformable sealing ring and a support ring made of plastic, which sealing assembly is supported on a radial support shoulder present on the inlet connector and seals against the connection socket. To prevent radial gaps between the support ring on the one hand and the inlet connector and/or the connection socket on the other hand, into which gaps the sealing ring extrudes under high pressure and becomes (Continued)

damaged, the support ring situated between the sealing ring and the support shoulder is made of an elastically deformable plastic material.

5 Claims, 7 Drawing Sheets

(52) U.S. Cl.
CPC ............... *F02M 2200/856* (2013.01); *F02M 2200/9015* (2013.01)

(58) Field of Classification Search
USPC ........................................................ 123/470
See application file for complete search history.

(56) References Cited

U.S. PATENT DOCUMENTS

| | | | | |
|---|---|---|---|---|
| 4,109,942 A | * | 8/1978 | Morrill | E21B 33/04 285/123.13 |
| 4,324,407 A | * | 4/1982 | Upham | E21B 33/1212 277/336 |
| 4,848,778 A | * | 7/1989 | von Pragenau | B64G 1/403 277/644 |
| 6,640,784 B1 | * | 11/2003 | Sims, Jr. | F02M 55/025 123/456 |
| 6,701,899 B2 | | 3/2004 | Liskow | |
| 7,195,003 B2 | | 3/2007 | Liskow | |
| 7,793,944 B2 | * | 9/2010 | Otuka | F16J 15/062 277/584 |
| 2009/0308954 A1 | | 12/2009 | Giorgetti et al. | |

FOREIGN PATENT DOCUMENTS

| | | |
|---|---|---|
| DE | 10324792 A1 | 12/2004 |
| EP | 1722100 A1 | 11/2006 |
| EP | 1862668 A1 | 12/2007 |
| EP | 2112367 A1 | 10/2009 |
| EP | 2208882 A1 | 7/2010 |
| EP | 2284385 A1 | 2/2011 |
| JP | H08135795 A | 5/1996 |
| JP | H10068467 | 5/1996 |
| JP | H09222058 A | 8/1997 |
| JP | H11315925 A | 11/1999 |
| JP | 2004513293 A | 4/2004 |
| JP | 2004513298 A | 4/2004 |
| JP | 2005155743 A | 6/2005 |
| JP | 2009008238 A | 1/2009 |
| JP | 2011196260 A | 10/2011 |
| JP | 2012067688 A | 4/2012 |
| WO | 2006112301 A1 | 10/2006 |

* cited by examiner

VALVE FOR THE METERING OF HIGHLY PRESSURIZED FLUID

FIELD

The present invention relates to a valve for metering highly pressurized fluid, the general term "fluid," standing for a flowing medium, being used in accordance with the theory of flow for gases and liquids.

BACKGROUND INFORMATION

A conventional injection valve for injecting highly pressurized fuel into the combustion chamber of an internal combustion engine, described in German Patent Application No. DE 101 06 168 A1, has an inlet connector used to introduce fuel into the interior of the injection valve, which connector can be placed into a corresponding connection socket of a fuel supply line. The inlet connector is sealed relative to the connection socket by a sealing assembly situated on the inlet connector. The fuel supply line standardly has a plurality of connection sockets via which fuel is distributed to a plurality of injection valves. The sealing assembly includes an intermediate or supporting ring fastened on the inlet connector, and two sealing rings realized as O-rings, seated above and below the intermediate or supporting ring on the inlet connector. The intermediate or supporting ring is preferably spray-molded onto the inlet connector, and is dimensioned such that a radial gap remains between its outer circumference and the inner wall of the connection socket. One of the sealing rings is situated below the intermediate or support ring, and one is situated above the intermediate or support ring. Due to the fuel pressure in the supply line and the connection socket, the upper sealing ring is pressed axially against the intermediate or support ring, and the lower sealing ring is pressed axially against a support shoulder that is fashioned on the side of the lower sealing ring oriented away from the intermediate or support ring, on the inlet connector, by a plastic extrusion molding. Here, both sealing rings seal radially against the inner wall of the connection socket.

It is also conventional to equip the sealing assembly with only one sealing ring, fashioned as an O-ring, and to situate the support ring between the sealing ring and support shoulder on the inlet connector. For reasons of assembly, the support ring is slotted, and, during installation of the inlet connector, is placed into the connection socket with its outer ring surface against the socket wall of the connection socket. In this way, a radial gap results between the inner ring surface of the support ring and the inlet connector.

It has turned out that the sealing ring pressed against the support ring under the pressure of the fuel is, over the long term, extruded into the radial gap between the support ring and the inlet connector on the one hand, and between the support ring and the connection socket on the other hand, and in this way is damaged over the long term to such an extent that its sealing function is impaired, or is completely lost.

SUMMARY

A valve according to an example embodiment of the present invention may have the advantage that through the elastic deformation of the support ring brought about via the sealing ring loaded with fluid pressure, when the injection valve is commissioned all radial gaps between inlet connector, support ring, and connection socket are eliminated, so that any gap extrusion of the sealing ring, and concomitant damage to the sealing ring, is reliably excluded, and thus the durability of the fluid seal between the fluid supply line and the injection valve is substantially increased.

According to an advantageous specific embodiment of the present invention, the elastic deformation of the support ring required to close the gap is brought about by its constructive design. This design is distinguished in that the support ring has two frustum-shaped end faces that are parallel to one another, and has an outer and an inner ring surface, of which one ring surface is made cylindrical and one ring surface is made conical in such a way that of the two frustum-shaped end faces limited by the ring surfaces, the one has a smaller surface than the other, and in that the configuration of the support ring on the inlet connector between the sealing ring and the support shoulder is realized in such a way that the frustum-shaped end face having the smaller surface is oriented toward the support shoulder.

Through this constructive design, when the injection valve is commissioned, and given the increase connected therewith of the fluid pressure in the fluid supply line and in the connection socket, the support ring is displaced via the sealing ring with its cylindrical ring surface along the connection socket, or the inlet connector, towards the support shoulder, and presses against the inlet connector or connection socket with its conical ring surface.

If the outer ring surface is cylindrical and the inner ring surface is conical in such a way that the frustum-shaped end face having the larger surface has a smaller central cone opening than does the frustum-shaped end face having the smaller surface, then the support ring not loaded with pressure abuts the support shoulder with the cone edge in the smaller-surface end face, surrounding the larger cone opening, and, when there is pressure loading, folds outwardly along the connection socket in the direction of the support shoulder until it abuts axially on the support shoulder and presses against the inlet connector and, in its region close to the sealing ring, against the connection socket, in each case radially without a gap.

If, alternatively, the inner ring surface is cylindrical and the outer ring surface is conical, in such a way that the smaller-surface frustum-shaped end face has a smaller outer diameter relative to the larger-surface end face, then the unloaded support ring abuts the support shoulder with the outer edge of its smaller-surface frustum-shaped end face, and, as the fluid pressure increases, folds radially inward along the inlet connector in the direction toward the support shoulder, until it axially abuts the support shoulder and presses against the connection socket and, in its region close to the sealing ring, against the inlet connector, in each case radially without a gap.

According to an advantageous specific embodiment of the present invention, in this constructive design of the support ring its dimensions are selected such that either between the inner ring surface and the inlet connector or between the outer ring surface and the connection socket there results a small radial gap that facilitates the installation of the inlet connector into the connection socket.

According to a further specific embodiment of the present invention, the support ring conventionally has two annular end faces that run at a right angle to the ring axis, as well as an inner and outer circumferential ring surface, which run parallel to one another and limit the two end faces. The required deformation of the support ring is brought about by the selection of the material, in that the support ring is made of an FKM elastomer (a fluoroelastomer). The axial introduction of force, caused by the increasing fluid pressure, that takes place via the sealing ring abutting the support ring causes an elastic deformation of the support ring and, through radial deflection of the forces, a gap-free seating of the support ring on the inlet connector and connection socket.

According to an advantageous specific embodiment of the present invention, the end face of the support ring facing the sealing ring is provided with a circumferential recess that is adapted to the contour of the pressure-unloaded sealing ring. In this way, already at low fluid pressures the sealing ring and support ring come into contact with a positive fit, and bring about an introduction of force into the support ring for the elastic deformation thereof.

BRIEF DESCRIPTION OF THE DRAWINGS

In the description below, the present invention is explained in more detail on the basis of exemplary embodiments shown in the figures.

DETAILED DESCRIPTION OF EXAMPLE EMBODIMENTS

Figure 1:
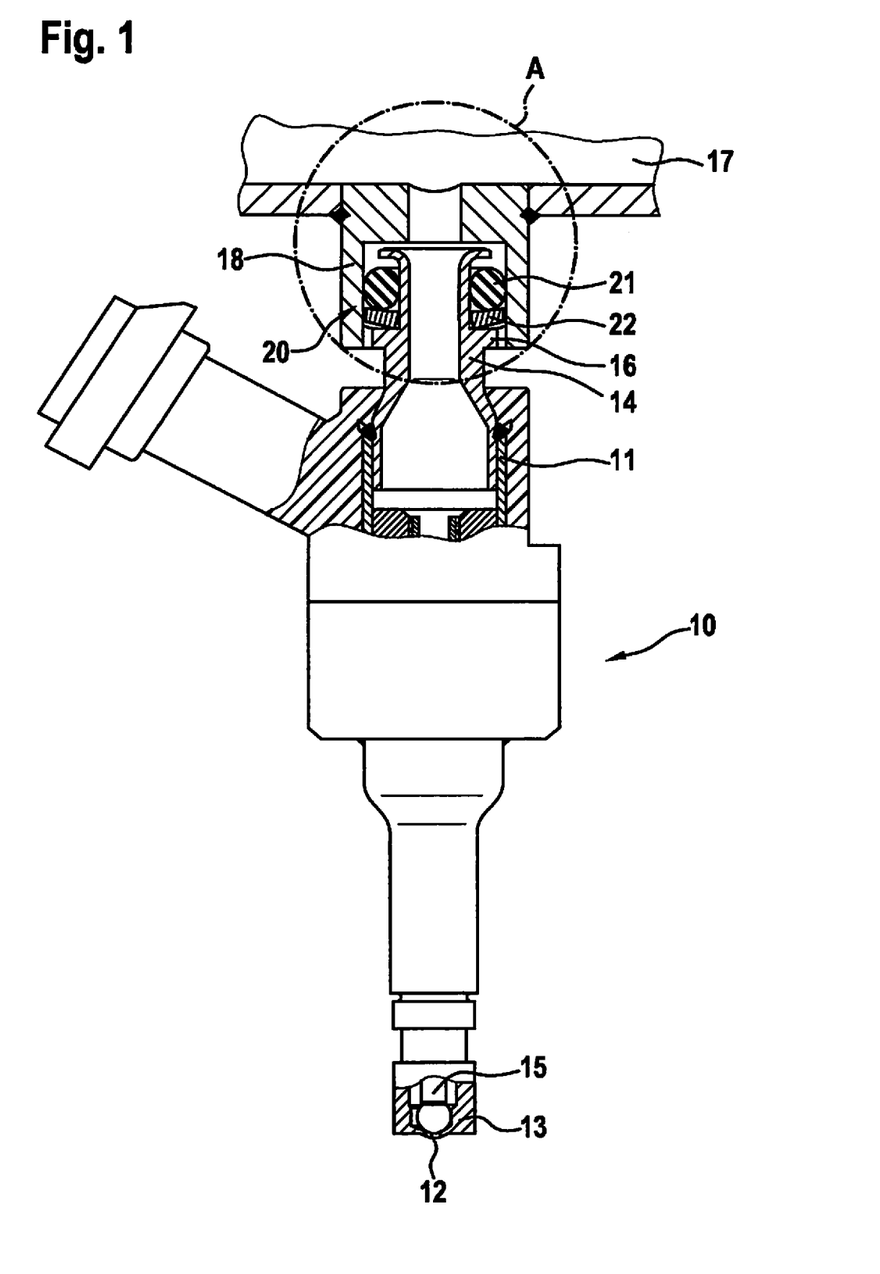
FIG. 1 shows a side view of a valve for metering fluid connected to a fluid supply line, partially sectioned.

Valve 10, shown in a side view in FIG. 1, for metering highly pressurized fluid, is preferably used as an injection valve for injecting fuel into the intake duct or combustion chamber of an internal combustion engine. However, it can also be used as a metering valve for the dosed injection of a fluid reducing agent into the exhaust train, for the purpose of reducing nitrogen oxides. Valve 10 has a valve housing 11 that is sealed at its metering end by a valve seating element 13 containing a metering opening 12. For supplying fluid, an inlet connector 14 is set into the other, inlet-side end of valve housing 11, via which connector fluid flows into the interior of the valve to metering opening 12, controlled in a conventional manner by a valve element 15. Inlet connector 14 is provided with a radial support shoulder 16, and, in order to connect valve 10 to a fluid supply line 17, can be set into a connection socket 18 fashioned on fluid supply line 17. On inlet connector 14 there is situated a sealing assembly 20 that includes an elastically deformable sealing ring 21 and a support ring 22 made of plastic. Support ring 22 sits in displaceable fashion on inlet connector 14 between sealing ring 21 and support shoulder 16. When fluid supply line 17 is highly pressurized, sealing assembly 20 presses axially against support shoulder 16, and seals radially against inlet connector 14 and connection socket 18.

Due to manufacturing tolerances and assembly-related conditions, after assembly of valve 10 to fluid supply line 17 there remains a radial gap between support ring 22 on the one hand and inlet connector 14 and/or connection socket 18 on the other hand. As a result of this radial gap, when sealing ring 21 is loaded with high pressure, over the long term there results an extrusion of the sealing ring material into the radial gap, causing permanent damage to sealing ring 21, and causing impairment of the functionality of sealing assembly 20 over the long term.

In order to prevent such radial gaps, support ring 22 is made of an elastically deformable plastic material and is made such that, under the fluid pressure acting on sealing ring 21, it experiences an elastic deformation such that it abuts inlet connector 14 and connection socket 18 without a radial gap. Here, the required elastic deformation of support ring 22 is brought about, matched to the fluid pressure, by the constructive design of support ring 22, or by the selection of material.

Figure 2:
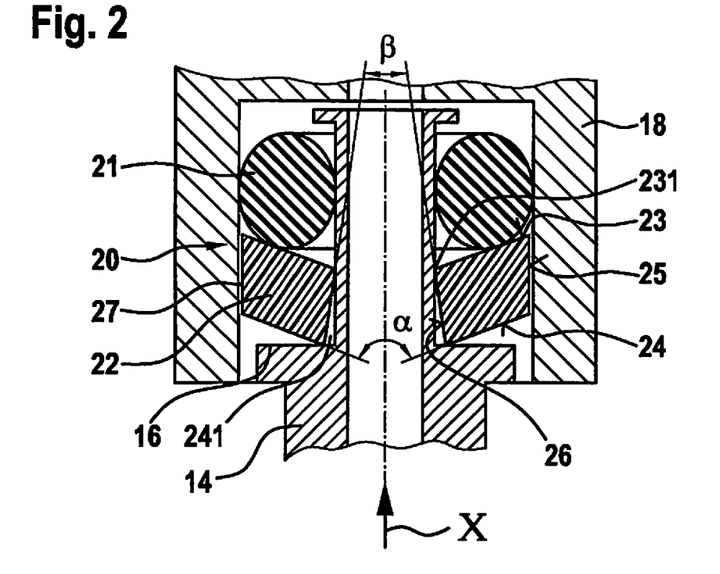
FIG. 2 shows an enlarged representation of detail A in FIG. 1 with a pressureless fluid supply line.
Figure 3:
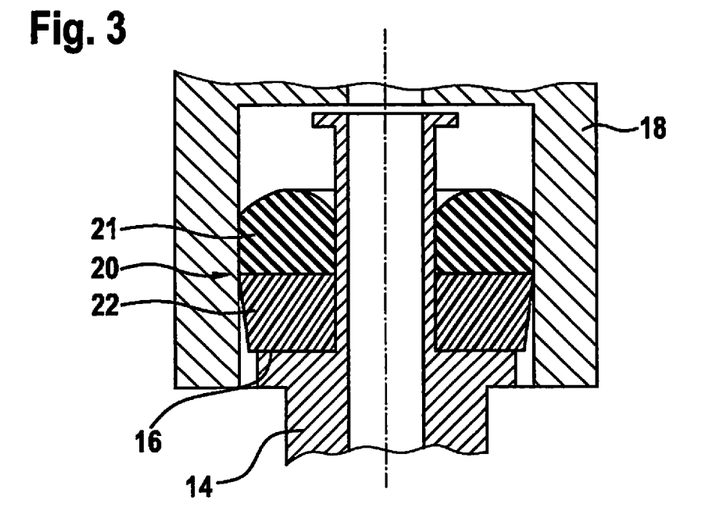
FIG. 3 shows the same representation as in FIG. 2, with pressurized fluid supply line.

In the first exemplary embodiment shown in FIGS. 2 and 3 of support ring 22, the constructive design of support ring 22, i.e., its shape and orientation, is the cause of its deformation that takes place under fluid pressure in order to bring about a gap-free seating. Support ring 22 has two frustum-shaped end faces parallel to one another 23, 24, as well as an outer ring surface 25 and an inner ring surface 26, of which one ring surface is made cylindrical and one is made conical. The conical curve is defined such that of the two end faces 23, 24 limited by ring surfaces 2526, the one has a smaller surface than the other. Support ring 22 is situated on inlet connector 14 in such a way that the smaller-surface frustum-shaped end face 24 is oriented toward support shoulder 16. Each of the frustum-shaped end faces 23, 24 has an obtuse cone angle a in an angular range between 135° and 180°, for example 140°. The respectively conical ring surface 25 or 26 has an acute cone angle β in an angular range between 0° and 45°, for example 20°.

Figure 4:
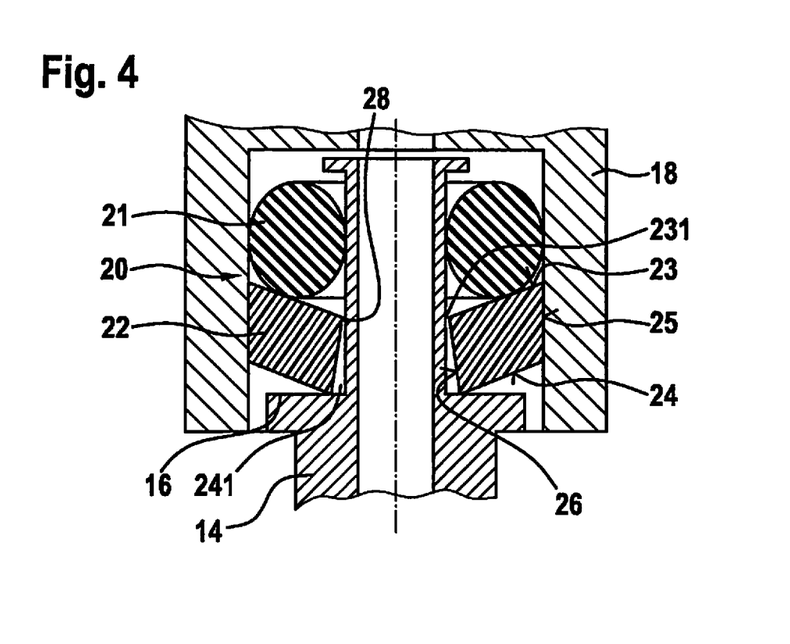
FIG. 4 shows an enlarged representation of detail A in FIG. 1, with a modification of the support ring according to FIG. 2, with pressureless fluid supply line.
Figure 5:
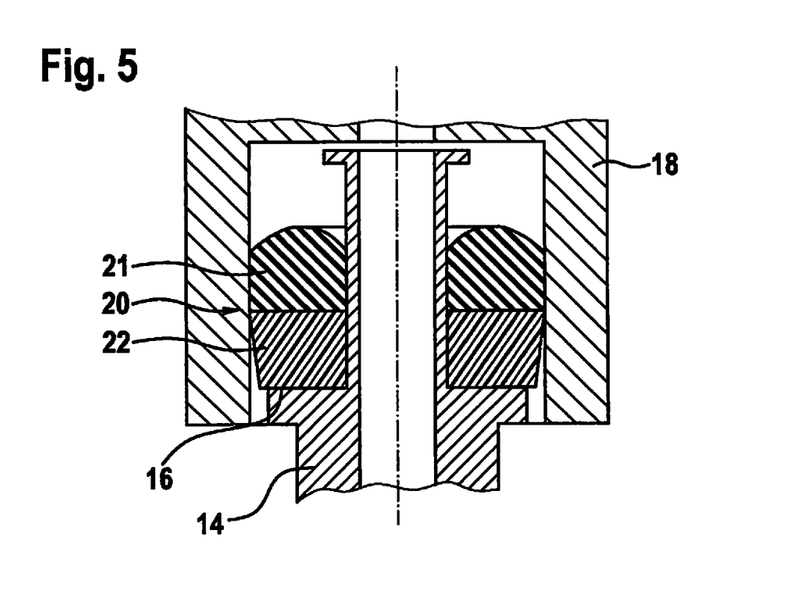
FIG. 5 shows the same representation as in FIG. 4, with pressurized fluid supply line.

In the first exemplary embodiment of support ring 22 according to FIGS. 2 and 3, and in the modified exemplary embodiment of support ring 22 according to FIGS. 4 and 5, outer ring surface 25 is cylindrical and inner ring surface 26 is conical, and runs in such a way that the larger-surface frustum-shaped end face 23 has a smaller central cone opening 231 than does smaller-surface frustum-shaped end face 24. In the exemplary embodiment of FIGS. 2 and 3, the inner diameter of smaller cone opening 231 in larger-surface end face 23 is equal to the outer diameter of inlet connector 14, and the outer diameter of support ring 22 is dimensioned slightly smaller than the inner diameter of connection socket 18, so that between support ring 22 and the inner wall of connection socket 18 there results a small radial gap 27 that facilitates the insertion of inlet connector 14 provided with sealing assembly 20 into connection socket 18. In the modified support ring 22 according to FIGS. 4 and 5, for the same purpose the outer diameter of support ring 22 is made equal to the inner diameter of connection socket 18, and the inner diameter of smaller cone opening 231 in larger-surface end face 23 is made slightly larger than the outer diameter of inlet connector 14, so that a small radial gap 28 results between inlet connector 14 and support ring 22.

In the exemplary embodiment shown in FIGS. 2 and 3 and in the modified exemplary embodiment shown in FIGS. 4 and 5, after assembly and when fluid supply line 17 is pressureless, support ring 22 abuts support shoulder 22 with the edge of larger cone opening 241 in smaller-surface end face 24. Outer ring surface 25 extends along the inner wall of connection socket 18 (FIGS. 2 and 4). When fluid supply line 17 is pressurized, support ring 22 folds outward in the direction of support shoulder 16, and presses circumferentially against connection socket 18 and, increasingly, against inlet connector 14, until it finally lies completely axially against support shoulder 16 (FIGS. 3 and 5). The deformation that takes place here of support ring 22 results in a gap-free radial seating on inlet connector 14 and, in the region of support ring 22 oriented toward sealing ring 21, a gap-free radial seating on connection socket 18.

Figure 6:
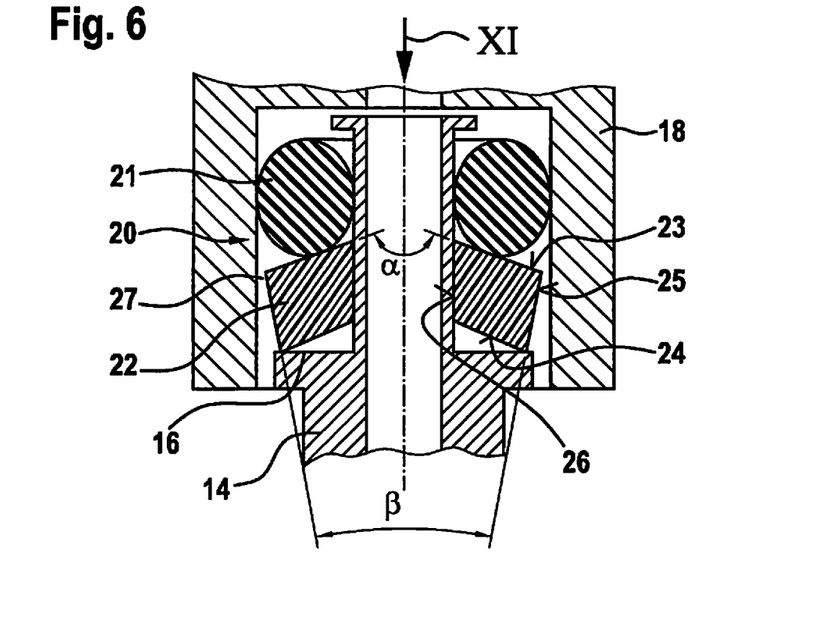
FIG. 6 shows an enlarged representation of detail A in FIG. 1, having a support ring according to a second exemplary embodiment, with pressureless fluid supply line.
Figure 7:
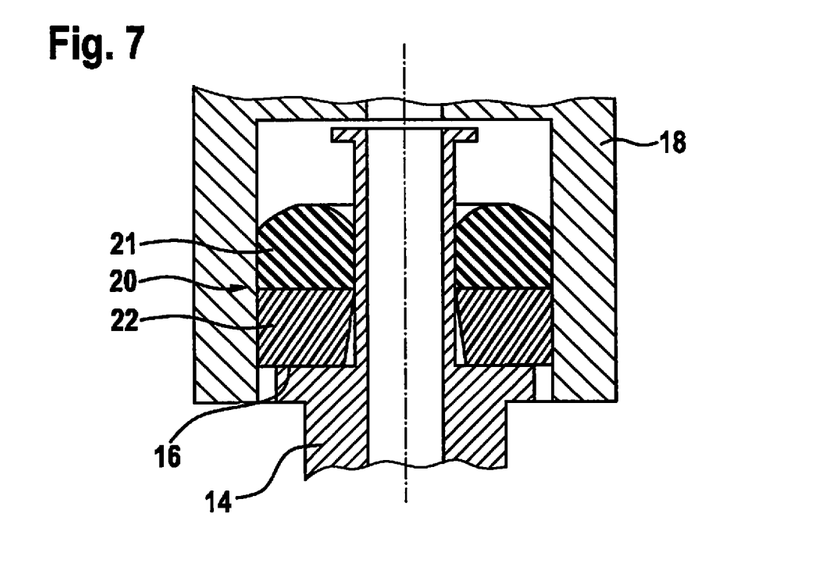
FIG. 7 shows the same representation as in FIG. 6, with pressurized fluid supply line.
Figure 8:
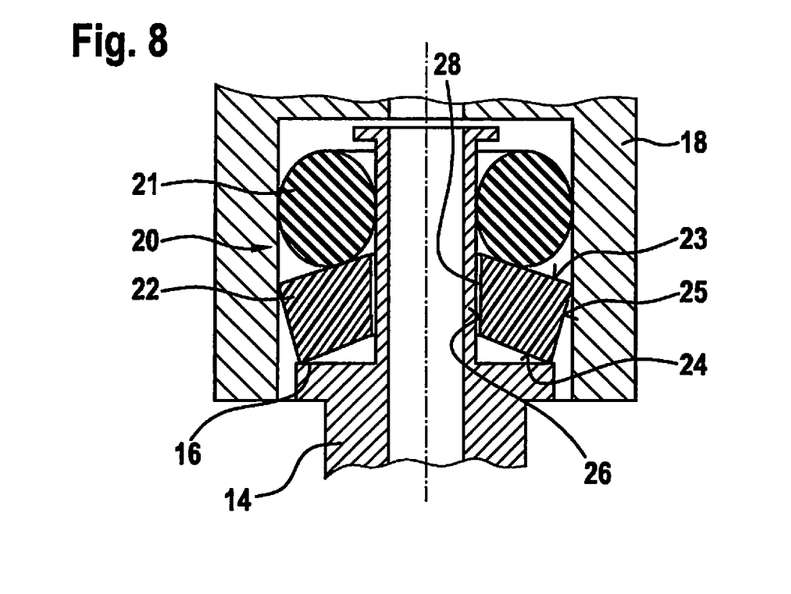
FIG. 8 shows an enlarged representation of detail A in FIG. 1, having a modification of the support ring according to the second exemplary embodiment according to FIG. 6, with pressureless fluid supply line.
Figure 9:
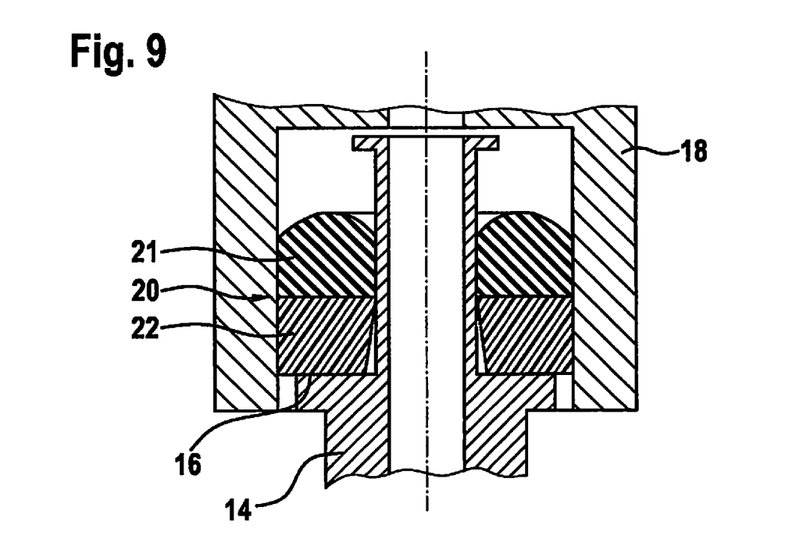
FIG. 9 shows the same representation as in FIG. 8, with pressurized fluid supply line.

Both in the second exemplary embodiment of support ring 22 shown in FIGS. 6 and 7 and in the modified second exemplary embodiment shown in FIGS. 8 and 9, inner ring surface 26 of support ring 22 is cylindrical and outer ring surface 25 is conical, in such a way that smaller-surface end face 24 has a smaller outer diameter relative to larger-surface end face 23. In the exemplary embodiment of FIGS. 6 and 7, the inner diameter of support ring 22 is equal to the outer diameter of inlet connector 14, and the outer diameter of larger-surface end face 23 is slightly smaller than the inner diameter of connection socket 18. In the modified exemplary embodiment shown in FIGS. 8 and 9, in contrast, the outer diameter of larger-surface end face 23 is equal to the inner diameter of connection socket 18, and the inner diameter of support ring 22 is made slightly larger than the outer diameter of inlet connector 14. In this way, when fluid supply line 17 is without pressure, in the exemplary embodiment of FIG. 6 there is a radial gap 27 between support ring 22 and connection socket 18, and, in the exemplary embodiment of FIG. 8, there is a radial gap 28 between support ring 22 and inlet connector 14, which in each case facilitates the assembly of valve 10 into connection socket 18.

After the assembly of valve 10 on fluid supply line 17, unloaded support ring 22 abuts support shoulder 16 with the outer edge of smaller-diameter end face 24 (FIGS. 6 and 8). As the pressure increases in fluid supply line 17, support ring 22 folds along inlet connector 14 toward support shoulder 16, and, under deformation, presses increasingly against connection socket 18 with its outer ring surface 25, until it abuts support shoulder 16 with its smaller-surface end face 24, and presses against connection socket 18 and, in its region oriented toward sealing ring 21, against inlet connector 14, radially without a gap in each case (FIGS. 7 and 9).

Figure 10:
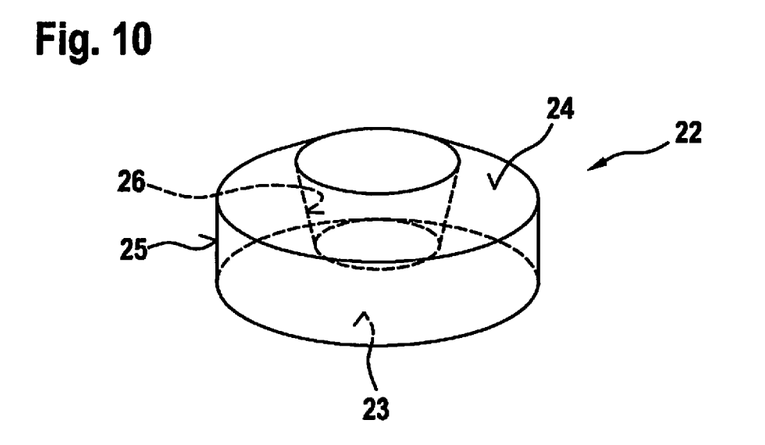
FIG. 10 shows a perspective view from below, in the direction of arrow X in FIG. 2, of the support ring according to the first exemplary embodiment according to FIG. 2.
Figure 11:
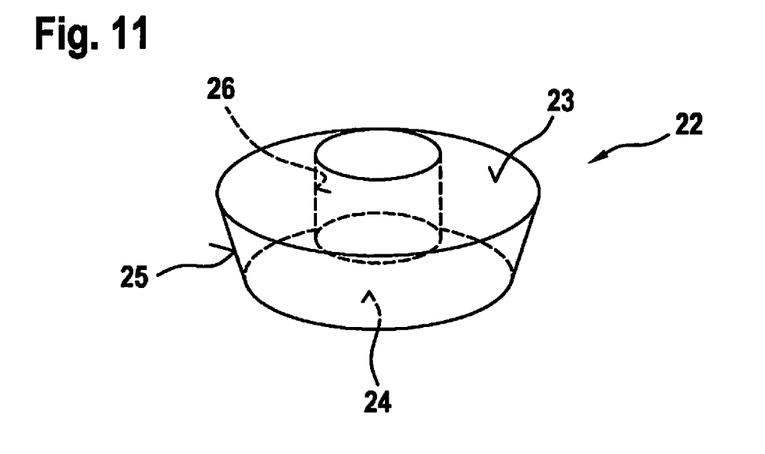
FIG. 11 shows a perspective top view in the direction of arrow XI in FIG. 6 of the support ring, according to the second exemplary embodiment according to FIG. 6.

Support ring 22 shown in FIGS. 2 through 5, respectively in the pressure-free and pressure-loaded state, according to the first and modified first exemplary embodiment, is shown in FIG. 10 in a perspective view from below according to arrow X in FIG. 2. Support ring 22 shown in FIGS. 6 through 9, respectively in the pressure-free and pressure-loaded state, according to the second and the modified second exemplary embodiment, is shown in FIG. 11 in a perspective top view according to the arrow in the direction XI in FIG. 6. In both exemplary embodiments, the axial length of support ring 22 is dimensioned such that it corresponds approximately to 0.1 to 1 times the radial ring width, or the radial spacing between inlet connector 14 and connection socket 18.

Figure 12:
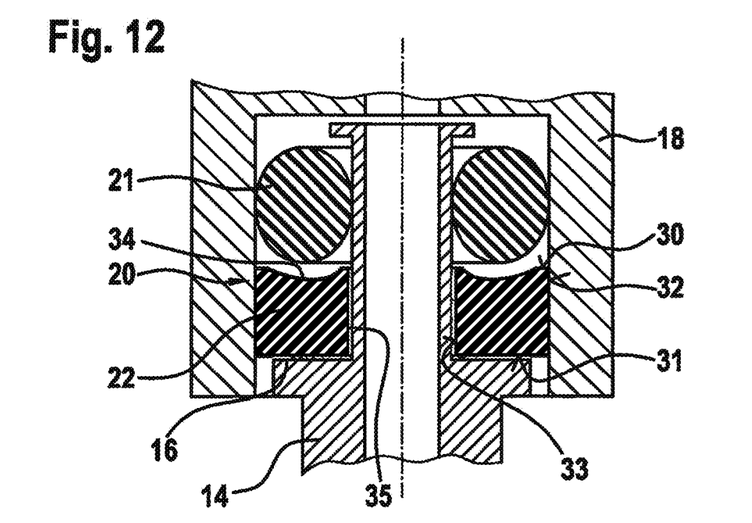
FIG. 12 shows an enlarged representation of detail A in FIG. 1, having a third exemplary embodiment of the support ring with pressureless fluid supply line.
Figure 13:
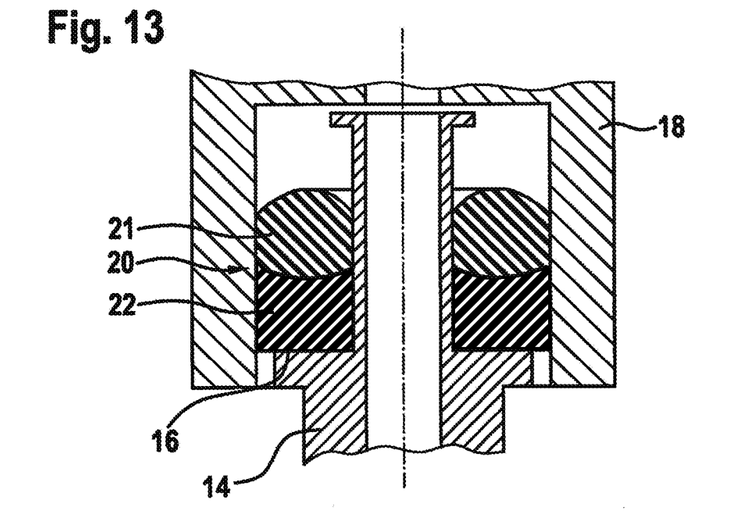
FIG. 13 shows the same representation as in FIG. 12, with pressurized fluid supply line.

Support ring 22 used in sealing assembly 20 in FIGS. 12 and 13, according to a third exemplary embodiment, has, in a conventional manner, two annular end faces 30, 31 that run at a right angle to the ring axis, and has an outer and inner ring surface 32 and 33 that run parallel to one another and that limit the two annular end faces 30, 32 inwardly and outwardly. Preferably, the radial ring width is made slightly smaller than the radial spacing between inlet connector 14 and connection socket 18. In the exemplary embodiment of FIG. 12, for this purpose the inner diameter of support ring 22 is made slightly larger than the outer diameter of inlet connector 14, so that at inlet connector 14 there results a radial gap 35 from support ring 22. The required deformation of support ring 22 in order to close the radial gap between support ring 22 on the one hand and inlet connector 14 and/or connection socket 18 on the other hand is here brought about through the selection of material of support ring 22. If support ring 22 is made of an FKM elastomer then, when the fluid line is pressurized, the pressure force introduced into support ring 22 via sealing ring 21 is converted in support ring 22 into radial forces that radially deform support ring 22 sufficiently to achieve a reliable closing of the radial gap (FIG. 13). Advantageously, in end face 30 of support ring 22 facing sealing ring 21 there is made a circumferential recess 34 that is matched to the contour of pressure-unloaded sealing ring 21. Due to this recess 34, already at low pressures sealing ring 21 comes into contact with support ring 22 with a positive fit, thereby already bringing about an initial force deflection, in the radial direction, of the axial pressure force introduced into support ring 22 via sealing ring 21.

What is claimed is:

1. A seal assembly for a connector of a fluid supply line, comprising:
an inlet connector that can be placed in a connection socket of a fluid supply line; and
a sealing assembly situated on the inlet connector, the sealing assembly having an elastically deformable sealing ring and a support ring made of plastic, the sealing assembly being supported on a radial support shoulder present on the inlet connector and sealing against the connection socket, the support ring being situated between the sealing ring and the support shoulder and being made of an elastically deformable plastic material, the support ring being made such that under a fluid pressure acting on the sealing ring, the support ring experiences an elastic deformation that brings about a gap-free radial seating on the inlet connector and the connection socket;
wherein the elastic deformation of the support ring is brought about through a constructive design of the support ring;
wherein the support ring has two frustum-shaped end faces parallel to one another, and an outer and an inner ring surface, one of the ring surfaces is made cylindrical and one is made conical in such a way that of the two frustum-shaped end faces limited by the ring surfaces, one of the frustum-shaped end faces has a smaller surface than does the other of the frustum-shaped end faces, and the support ring is situated on the inlet connector in such a way that the smaller-surface frustum-shaped end face is oriented toward the support shoulder; and wherein the inner ring surface is cylindrical, and the outer ring surface runs conically in such a way that the smaller-surface frustum-shaped end face has a smaller outer diameter compared to the larger-surface frustum-shaped end face.

2. The seal assembly as recited in claim 1, wherein an inner diameter of the support ring is dimensioned equal to an outer diameter of the inlet connector, and an outer diameter of the larger-surface frustum-shaped end face, in order to form a radial gap to the connection socket, is dimensioned slightly smaller than an inner diameter of the connection socket.

3. The seal assembly as recited in claim 1, wherein an outer diameter of the larger-surface frustum-shaped end surface is dimensioned equal to an inner diameter of the connection socket, and an inner diameter of the support ring, in order to form a radial gap to the inlet connector, is dimensioned slightly larger than an outer diameter of the inlet connector.

4. The valve as recited in claim 1, wherein an axial length of the support ring is dimensioned equal to 0.1 to 1 times a maximum radial ring width.

5. A seal assembly for a connector of a fluid supply line, comprising:
   an inlet connector that can be placed in a connection socket of a fluid supply line; and
   a sealing assembly situated on the inlet connector, the sealing assembly having an elastically deformable sealing ring and a support ring, the sealing assembly being supported on a radial support shoulder present on the inlet connector and sealing against the connection socket, the support ring being situated between the sealing ring and the support shoulder and being made of an elastically deformable plastic material, the support ring being made such that under a fluid pressure acting on the sealing ring, the support ring experiences an elastic deformation that brings about a gap-free radial seating on the inlet connector and the connection socket;
wherein the support ring has two annular end faces that run at a right angle to a ring axis, and an outer and an inner ring surface that run parallel to one another and that limit the two end faces, and the elastic deformation of the support ring is brought about through a selection of a material of the support ring;
wherein the support ring is made of a fluoroelastomer;
wherein a radial ring width of the support ring is dimensioned slightly smaller than a radial spacing between the inlet connector and the connection socket; and
wherein the end face, oriented toward the sealing ring, of the support ring has a circumferential recess that is adapted to a contour of the sealing ring in an unloaded state.

* * * * *